US008875300B1

(12) United States Patent
Miller et al.

(10) Patent No.: US 8,875,300 B1
(45) Date of Patent: Oct. 28, 2014

(54) METHOD AND APPARATUS FOR AUTHENTICATING A REQUEST BETWEEN TASKS IN AN OPERATING SYSTEM

(75) Inventors: Greg Miller, San Jose, CA (US); Michael Pinkerton, Ashburn, VA (US)

(73) Assignee: Google Inc., Mountain View, CA (US)

( * ) Notice: Subject to any disclaimer, the term of this patent is extended or adjusted under 35 U.S.C. 154(b) by 1973 days.

(21) Appl. No.: 11/731,673

(22) Filed: Mar. 30, 2007

(51) Int. Cl.
*G06F 15/16* (2006.01)
*G06F 9/54* (2006.01)

(52) U.S. Cl.
CPC . *G06F 9/54* (2013.01); *G06F 9/545* (2013.01)
USPC .............................................. 726/26; 726/27

(58) Field of Classification Search
CPC .................................. G06F 9/54; G06F 9/545
USPC .............. 726/9, 26, 27, 28, 29; 709/224, 201, 709/212, 213, 220, 223; 707/E17.014, 707/E17.002, 769; 719/318, 330; 380/270, 380/255, 247
See application file for complete search history.

(56) References Cited

U.S. PATENT DOCUMENTS

2003/0226012 A1* 12/2003 Asokan et al. ................ 713/156
2005/0166045 A1* 7/2005 Sueyoshi ...................... 713/164
2006/0069692 A1* 3/2006 Pernia ........................... 707/100
2010/0132024 A1* 5/2010 Ben-Natan et al. ............... 726/9

OTHER PUBLICATIONS

Apple Mailing Lists, Forum topic "Re: DO and authentication," posted Jan. 4, 2002 [online, retrieved on Mar. 27, 2007 from http://lists.apple.com/archives/cocoa-dev/2002/Jan/msg00182.html].

* cited by examiner

*Primary Examiner* — Jeffrey Pwu
*Assistant Examiner* — Nega Woldemariam
(74) *Attorney, Agent, or Firm* — Young Basile Hanlon & MacFarlane P.C.

(57) ABSTRACT

One embodiment of the present invention provides a system that authenticates requests between tasks in an operating system. During operation, a first task prepares a request to perform an operation in a second task. In doing so, the first task attaches a credential to the request, and then a trusted entity transfers the request and the credential to the second task. Next, the second task determines whether the credential is valid. If the credential is valid, the second task determines from the credential whether the first task is authorized to request the operation, and, if so, proceeds to perform the operation.

19 Claims, 3 Drawing Sheets

METHOD AND APPARATUS FOR AUTHENTICATING A REQUEST BETWEEN TASKS IN AN OPERATING SYSTEM

BACKGROUND

1. Field of the Invention

The present invention relates to techniques for controlling access to computational resources and data within computer systems. More specifically, the present invention relates to a method and an apparatus for authenticating a request between tasks in an operating system.

2. Related Art

In modern operating systems, a program may be associated with one or more independent processes, which may communicate with each other using inter-process communication (IPC) mechanisms provided by the operating system. In multi-user systems, such inter-process communication mechanisms can allow a process to provide services to processes associated with different users. In doing so, the process may provide different data or different levels of service to different calling processes based on users associated with the calling processes. However, a process providing such a service may not be able to simply trust an identity claimed by a calling process, because doing so would risk leaking sensitive information to an unauthorized user. Although some techniques authenticate callers by exchanging digital certificates and/or passwords via IPC, these techniques add additional overhead and complexity to inter-process interactions.

Hence, what is needed is a method that facilitates authenticating a request between processes without the above-described limitations.

SUMMARY

One embodiment of the present invention provides a system that authenticates requests between tasks in an operating system. During operation, a first task prepares a request to perform an operation in a second task. In doing so, the first task attaches a credential to the request, and then a trusted entity transfers the request and the credential to the second task. Next, the second task determines whether the credential is valid. If the credential is valid, the second task determines from the credential whether the first task is authorized to request the operation, and, if so, proceeds to perform the operation.

In some embodiments, the trusted entity is an operating system kernel.

In some embodiments, the first task and the second task are different operating system processes.

In some embodiments, the second task produces a set of results in response to the request, and then modifies the set of results based on authentication information contained within or determined from the credential.

In some embodiments, the system can limit the results which are returned by the operation based on authentication information determined using the credential.

In some embodiments, the system provides a standardized service with extensible capabilities that limits responses to client requests based on a credential for the client presented to the service by the trusted entity.

In some embodiments, the credential is a send-right for a task-port that is associated with the first task.

In some embodiments, the credential specifies an identity associated with the first task.

In some embodiments, the identity is specified with a user ID and/or a group ID.

In some embodiments, transferring the request and the credential to the second task involves sending a Mach message from the first task to the second task.

Table 1 illustrates a function interface for sending a task-port to a task in accordance with an embodiment of the present invention.

Table 2 illustrates a function interface for receiving a task-port to a task in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Inter-Process Communication

Many operating systems support simultaneous execution of a number of programs, such as web browsers, databases, email clients, and other application programs, using multiple processes. Some or all of these programs may need to interact with each other, which creates a need for inter-process communication (IPC). Different operating systems support different flavors of IPC, with varying implementations, including: CORBA (the Common Object Request Broker Architecture), Java RMI (remote method invocation), RPC (remote procedure call), and Cocoa Distributed Objects. Such IPC implementations typically involve an abstraction of one process invoking methods in another process. In an object-based system, the IPC implementation may allow an object in one process to communicate with objects in other processes as if they are local objects. IPC mechanisms often facilitate client/server operations, in which a server process "vends" an object or method that can then be accessed by one or more clients. Client processes typically first obtain a reference to the vended object (or method), and then send requests and/or messages to remotely invoke desired operations.

Figure 1:
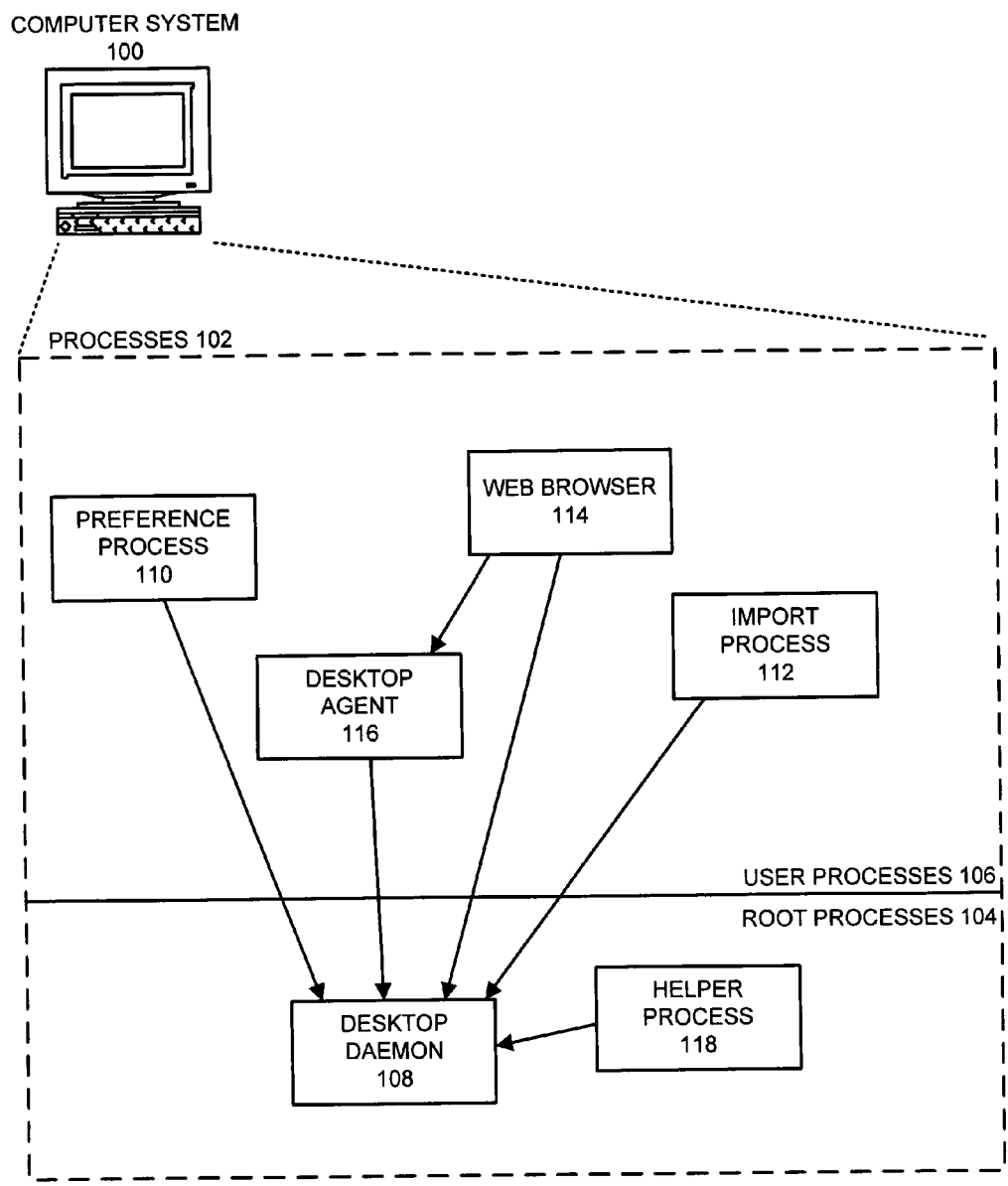
FIG. 1 illustrates a scenario in which a number of processes in a computer system interact using IPC in accordance with an embodiment of the present invention.

FIG. 1 illustrates a scenario in which a number of processes 102 in a computer system 100 interact using IPC. In this scenario, the application involves a number of cooperating processes invoked by different users. A main process, desktop daemon 108, provides a service to all of the users of a multi-user system. This desktop daemon 108 starts at boot time, runs as a "root process" 104 (e.g., as a process started by an administrative, or "root," user), and supports local search functionality as well as other customizable features. For instance, the desktop daemon 108 may be responsible for: indexing files, managing the set of volumes that are currently online and searchable, and processing queries from user processes. A number of root processes 104 and user processes 106 access and/or enhance the functionality of the desktop daemon 108 using IPC, as indicated by the arrows which indicate IPC calls in FIG. 1. For instance, a number of user processes 106 that make IPC calls on the desktop daemon 108 may include: a process that allows a user to specify search preferences 110, a process used to import files 112, one or more web browsers 114, and a desktop agent process 116. In addition to these user processes 106, the desktop daemon 108 may also receive IPC calls from other root processes 104, such as helper process 118.

For some applications, or in a system with only a single user, a given service may not care about the identity and/or user associated with a calling process. For instance, if all of the processes and data in the system belong to a single user, and connections can only come from within that user's session, no security violations are expected. However, security can be a major concern for a service that needs to run as a root process 104 in a multi-user system, for instance to gain higher privileges or to achieve an economy of scale in providing the service to multiple users of a multi-user system. In this case, the service may need to determine the identity associated with a calling process in order to limit and/or execute a query properly. For instance, the service may need to ensure that a calling process executed by a first user does not divulge restricted information belonging to another user.

Many techniques used for IPC do not include support for sending user authentication information to another process. For instance, in systems where calling processes communicate with services using mechanisms (such as shared memory, semaphores, pipes, and/or transmission-control protocol (TCP) sockets), additional program layers might be added on top of the IPC functionality to provide authentication, e.g. using certificates or password prompts to authenticate the identity of each caller. Other techniques, such as Unix domain sockets and Mac OS X security trailers, allow a calling process to send credentials to another process. These techniques have a number of problems, for example they: are not very flexible; typically do not integrate well with high-level programming; and are limited to select operating systems.

Inter-Process Communication in Mac OX S Using Mach-Ports

One of the IPC mechanisms in Mac OS X™ is the Cocoa Distributed Object (DO) system, which provides a robust, fast, and object-oriented way to send and receive messages between processes on the same machine (as well as to other machines). DO is built on "Mach messaging," which allows objects to send messages to other objects using "Mach-ports." Objects in the system can be associated with one or more Mach-ports, to which other objects in the system can send requests. For instance, every central processing unit (CPU) in the system may be associated with one or more Mach-ports. Similarly, every task in the system is typically assigned a Mach-port, which is called its "task-port." Objects can look up Mach- and task-ports in the system, for instance by using the discovery mechanism provided by launchd, the Mac OS X bootstrap server.

Note that while a task in Mac OS X may be associated with many Mach-ports (e.g. for communicating with a number of other entities), each task is usually associated with exactly one task-port. Objects can send messages and requests to given tasks using these task-ports. For instance, an object might suspend a task by calling a task_suspend function with a corresponding task-port as an argument.

Mach-ports are typically associated with a number of "rights," including "send-rights" and "receive-rights." For instance, one task may have a send-right to a given Mach-port, while another task has the receive-right for the same Mach-port. An object with a send-right for a Mach-port can send a message to the Mach-port, while an object with a receive-right for the Mach-port can receive messages sent to the Mach-port. Objects can send Mach-port rights to one another using Mach messages. Note that the operating system kernel maintains information on the Mach-ports that each task can validly access, and hence keeps track of such transfers.

In Mac OS X, while many objects may hold send-rights to a specific Mach-port, only one object may have a receive-right for the Mach-port. Also, in Mac OS X, the operating system kernel holds the receive-rights for all task-ports, so that all messages involving task-ports are first received and inspected by the kernel. The kernel can thereby serve as a trusted entity that can be used to authenticate task identity.

In one embodiment of the present invention, a first task sends a task-port to a second task when the first task requests the second task perform an operation. A trusted entity (such as the kernel) forwards the request and task-port to the second task. The second task then determines from the received task-port whether the first task is authorized to request the specified operation, and, if so, performs the operation.

Task Authentication Using Mach-Ports

Figure 2:
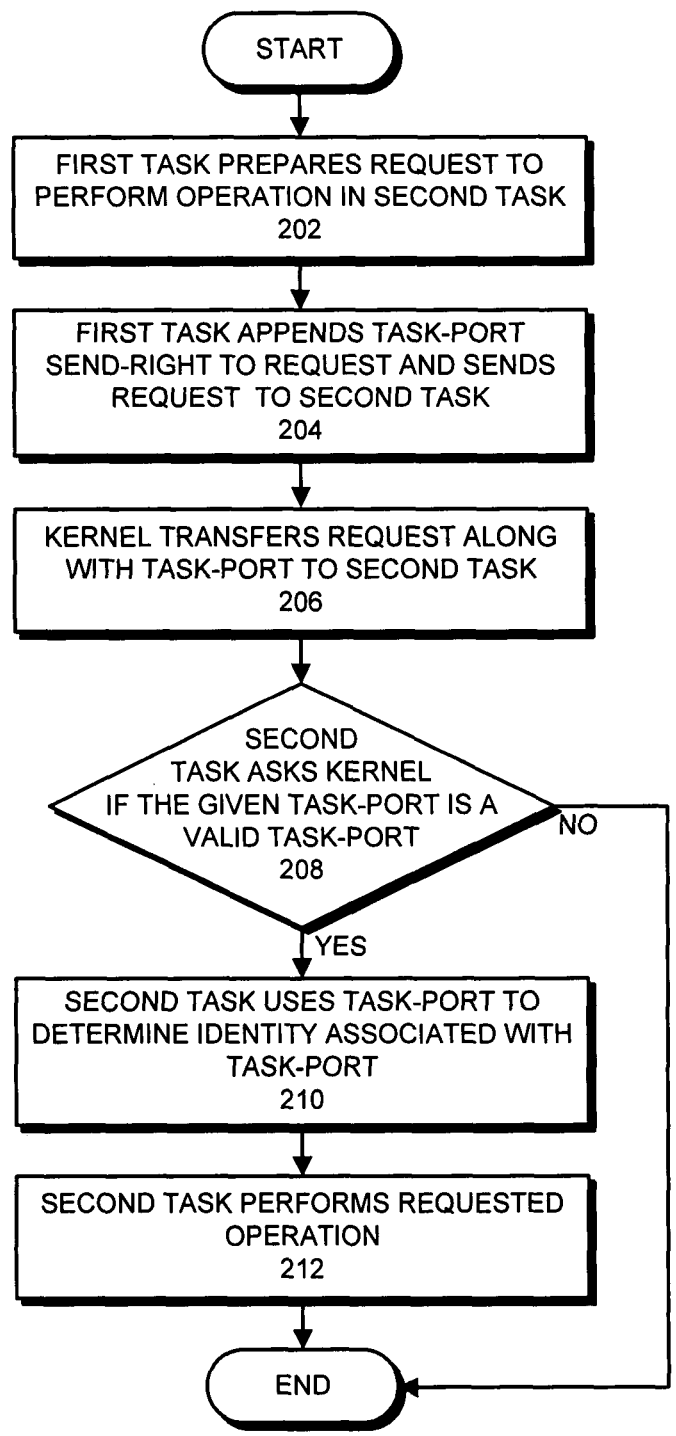
FIG. 2 presents a flow chart illustrating the process of authenticating a request between tasks in an operating system using Mach-ports in accordance with an embodiment of the present invention.

FIG. 2 presents a flow chart illustrating the process of authenticating a request between tasks in an operating system using Mach-ports. During operation, a first task prepares a request to perform an operation in a second task (operation 202). The first task then sends the request and its task-port (or more specifically, a send-right for its task-port) to the second task (operation 204). The kernel, which tracks the transfer of Mach-port rights, transfers the request and the task-port to the second task (operation 206). In this process, the kernel performs some basic checks on the task-port (e.g. that the task-port is a non-null object), but these checks do not determine whether the Mach-port transferred is indeed a valid task-port. Hence, the second task asks the kernel if the received task-port is a valid task port (operation 208). If so, the second task can use the task-port to determine the identity associated with the first task (operation 210). The second task then proceeds to perform the operation requested by the first task (operation 212). Note that the second task may adjust the operation or output results, depending on the identity associated with the first task. Note also that because a task is only aware of the Mach-ports that it has authorized access to, the first task cannot send a task-port over which it has no authority. If the kernel determines that a task has attempted to send an invalid task-port (operation 208), the requested operation is not performed.

The desktop daemon 108 shown in FIG. 1 receives input from many other processes (as indicated by the number of arrows pointing to the desktop daemon 108 in FIG. 1). Moreover, the desktop daemon 108 may vend a number of "listener" objects to which these other processes can send requests and objects using Mach messages. Some or all of these listener objects may need to know the identity of the user who sent them a message in order to provide a correct response. For example, when a user issues a query, a DO message is sent to a QueryListener object in the desktop daemon 108, which then needs to determine who sent the message in order to perform accurate permissions checks and ensure that data is not returned to a user who should not have access to that data. To provide authentication, the application programming interface (API) for both the sending and receiving processes include as a parameter a task-port identifier that can be used to identify the caller (as shown in Tables 1 and 2 for a listener and client, respectively). For instance, every method on a vended DO object in the desktop daemon 108 takes as an argument an NSMachPort object corresponding to the caller's task-port, or more specifically, a send-right to the caller's task-port. When the desktop daemon 108 receives a message, it can use the Mach-port provided by the authPort parameter to determine the caller's user ID. The kernel enforces security for creating, accessing, and sending task-ports, and can hence prevent task-ports from being spoofed. Note that for non-authenticated communication, objects can simply send standard Mach messages (using Mach-ports), and do not need to send task-port information.

TABLE 1

```
@protocol GDQueryListenerProtocol
...
- (out bycopy GDQueryResults *)
    runQuery: (in bycopy NSString *) query
    withParams: (in bycopy GDQueryParams *)params
    authPort: (in bycopy NSMachPort *) authPort;
...
@end
```

TABLE 2

```
id< GDQueryListenerProtocol> queryClient = ...
[queryClient runQuery: @"foo bar"    // The query string
    withParams:    [GDQueryParams queryParams]
    authPort:      [NSMachPort currentTaskPort]];
```

Figure 3:
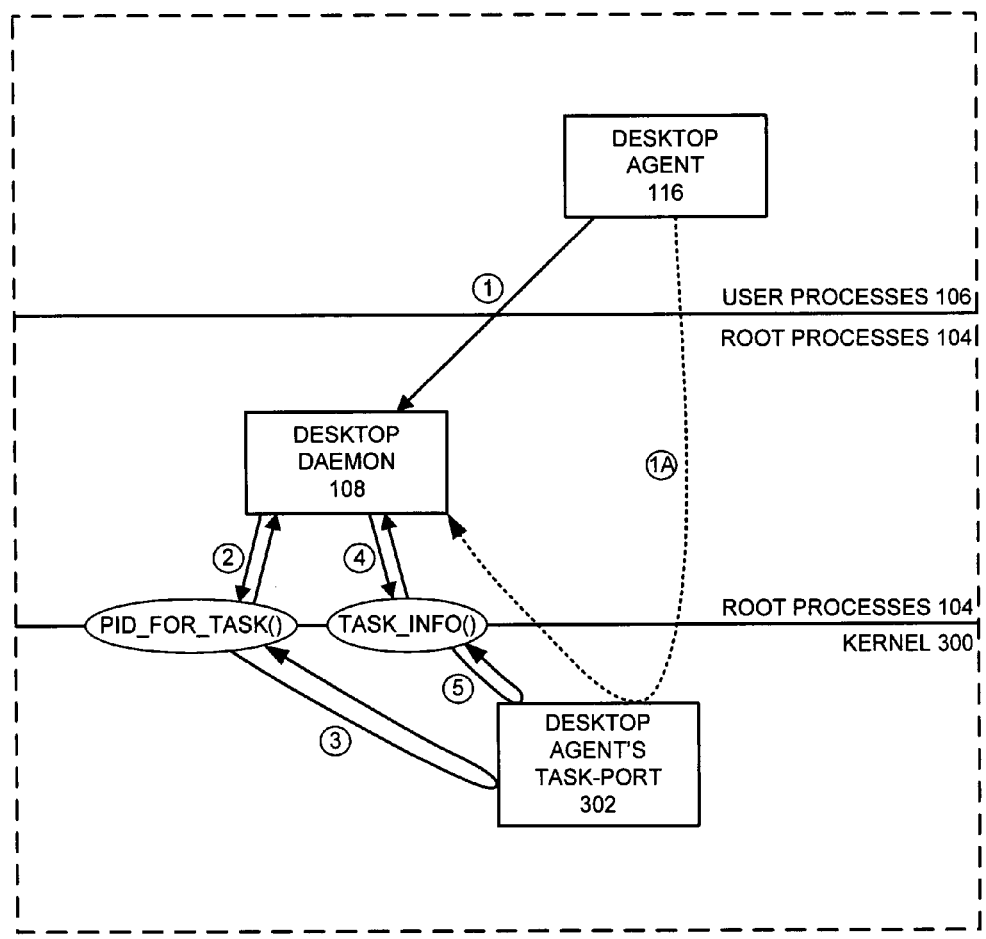
FIG. 3 illustrates the interaction between two processes during authentication in accordance with an embodiment of the present invention.

FIG. 3 illustrates the interaction between two processes from FIG. 1 in more detail. In FIG. 3, desktop agent 116 prepares a request, and sends the request and a send-right for its task-port to the desktop daemon 108 (shown by arrow 1). The kernel 300 detects that the request involves sending a Mach-port right, and transfers the request and task-port information to desktop daemon 108 (as shown by the dotted arrow 1A). Desktop daemon 108 can then call a pid_for_task( ) function with the task-port information as an argument (arrow 2). This pid_for_task( ) function asks the kernel 300 whether the Mach-port sent is indeed a valid task-port (arrow 3). If so, the kernel returns a process ID that corresponds to the task associated with the task-port. Otherwise, the kernel returns an error. If the task-port corresponds to valid task, the desktop daemon 108 next calls a task_info( ) function with the task-port information as an argument (arrow 4). This task_info( ) function sends a message to a specified Mach-port asking for the user ID associated with the Mach-port (arrow 5). Because the kernel 300 holds the receive-rights for all task-ports, the function in this case is handled by the kernel 300, which returns the user ID of the task (e.g., the identity associated with the task) to the desktop daemon. Note that because the task_info( ) function is not a direct trap (or system call) into the kernel 300, it is necessary to first call the pid_for_task( ) function to ensure that the Mach-port sent is indeed a task-port. Otherwise, a malicious caller could send a Mach-port that would return another user ID in response to the task_info( ) function, and thereby illegally access data and/or operations associated with that user ID.

In essence, the calling desktop agent 116 sends to the desktop daemon 108 a Mach-port right that gives the desktop daemon 108 permission to ask the kernel 300 who the owner of the request is. Because the desktop agent 116 can only send Mach-ports that it has authorized access to (and hence awareness of), and because the kernel 300 confirms that the sent Mach-port right is indeed a task-port and provides the user ID associated with that task port, the identity of the calling process can be trusted to the extent that the kernel 300 is trusted. If the caller attempts to send a send-right to an invalid task-port, the kernel detects the violation and halts the transfer of the corresponding request. Note that if a caller does have authorized access to another task's task-port, it is "safe" for the caller to send that other task's task-port to the desktop daemon 108. Because the caller cannot get the other task's task-port without going through the proper authentication mechanisms, the fact that the caller has authorized access to the other task's task-port indicates that the caller has a valid right to access services and data on the behalf of the other task.

Note that the task-port in this situation is used mainly for authentication, and not communication. A desktop agent 116 that is expecting a response for the request may send along with the request a send-right for another Mach-port (not a task-port), with which the desktop daemon 108 can send replies to the desktop agent 116.

Note also that Mach-port-rights can be sent from one task to another using Mach messages, in the same way that DO messages are sent, using high-level DO methods. Unlike some other available authentication techniques, these high-level methods do not require access to raw Mach-ports. For instance, security trailers add identity information to an extra structure at the end of Mach messages. This structure is checked and guaranteed by the kernel, which requires access to raw Mach-ports. Note that this type of access is not available at the programming level provided by DO. Hence, security trailers do not provide the same level of abstraction that is provided by the techniques described in the present invention.

In summary, to ensure a caller's identity, the system allows a Mach-task-port identifier to be sent as a parameter in an IPC call. The kernel ensures that the task-port information is valid, and allows the receiving process to use the task-port information to retrieve the true identity of the calling task. Hence, the receiver can verify the exact identity of the caller, and the caller is unable to claim to be another user and cause a security leak.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
    while executing a first task, preparing a first request to perform an operation in an existing second task, wherein preparing the first request includes including in the first request a task port belonging to the first task;
    using an operating system kernel to transfer the first request to the second task; and
    while executing the second task:

sending a second request from the second task to the trusted entity to determine whether the task port is valid, including requesting a process identifier associated with the task port using a system call of the operating system kernel and determining that the task port is valid if the operating system returns a process identifier for the task port identifier;

sending a third request from the second task to the task port to identify a user that owns the task port, including sending a message to the task port requesting a user identifier associated with the task port, wherein the user identifier associated with the task port is the user identifier having receive rights to the task port; and performing the operation using the second task based on the identified user.

2. The method of claim 1, wherein the first task and the second task are different operating system processes.

3. The method of claim 1, wherein performing the operation using the second task includes:

Generating a set of results for the first request; and

Modifying the set of results based on the identified user.

4. The method of claim 3, wherein modifying the set of results based on the identified user includes limiting the results returned by the operation to exclude restricted information belonging to a user other than the identified user.

5. The method of claim 1, wherein the task port included in the first request is a send-right for a first task port that is associated with the first task.

6. The method of claim 5, wherein transferring the first request to the second task includes sending a Mach message from the first task to the second task.

7. The method of claim 1, further comprising:

receiving a message from the task port indicating the identified user associated with the task port, wherein the received message is sent by the operating system kernel.

8. A non-transitory computer-readable storage medium storing instructions that when executed by a computer cause the computer to perform instructions comprising:

while executing a first task, preparing a first request to perform an operation in an existing second task, wherein preparing the first request includes including in the first request a task port belonging to the first task;

using a operating system kernel to transfer the first request to the second task; and while executing the second task:

sending a second request from the second task to the trusted entity to determine whether the task port is valid, including:

requesting a process identifier associated with the task port using a system call of the operating system kernel;

determining that the task port is valid if the operating system returns a process identifier for the task port identifier;

sending a third request from the second task to the task port to identify a user that owns the task port, including:

sending a message to the task port requesting a user identifier associated with the task port, wherein the user identifier associated with the task port is the user identifier having receive rights to the task port; and performing the operation using the second task based on the identified user.

9. The non-transitory computer-readable storage medium of claim 8, wherein the first task and the second task are different operating system processes.

10. The non-transitory computer-readable storage medium of claim 8, wherein performing the operation using the second task includes:

generating a set of results for the first request; and modifying the set of results based on the identified user.

11. The non-transitory computer-readable storage medium of claim 10, wherein modifying the set of results based on the identified user includes limiting the results returned by the operation to exclude restricted information belonging to a user other than the identified user.

12. The non-transitory computer-readable storage medium of claim 8, wherein the task port included in the first request is a send-right for a task-port that is associated with the first task.

13. The non-transitory computer-readable storage medium of claim 12, wherein transferring the first request to the second task includes sending a Mach message from the first task to the second task.

14. A computing device comprising:

a processor configured to execute an operating system stored in a memory, the operating system configured to execute a first program in a first task and a second program in a second task, wherein the second program includes instructions to:

receive a first request from the first program using the operating system, the first request including a message having a requested operation and a task port identifier;

determine that the task port identifier is associated with a valid task port by requesting a process identifier associated with the task port identifier from the operating system; and after the task port identifier is determined as being associated with a valid task port:

request a caller identity associated with the task port by sending a second request to the task port for a user identifier associated with the task port, wherein the user identifier associated with the task port is the user identifier having receive rights to the task port;

receive, from the operating system, the requested caller identity;

perform the requested operation based on the received caller identity.

15. The computing device of claim 14, wherein the first task and the second task are different operating system processes.

16. The computing device of claim 14, wherein the instructions to perform the requested operation include instructions to:

generate a set of results for the first request; and modify the set of results based on the identified user.

17. The computing device of claim 16, wherein the instructions to modify the set of results based on the identified user include instructions to limit the results returned by the operation to exclude restricted information belonging to a user other than the identified user.

18. The computing device of claim 14, wherein the task port included in the first request is a send-right for a first task port that is associated with the first task.

19. The computing device of claim 18, wherein the instructions to receive the first request by the second task includes instructions to receive a Mach message sent by the second task.

* * * * *